May 11, 1926.
R. E. HUNT
INSECT AND GERM TRAP AND DESTROYER
Filed April 21, 1924
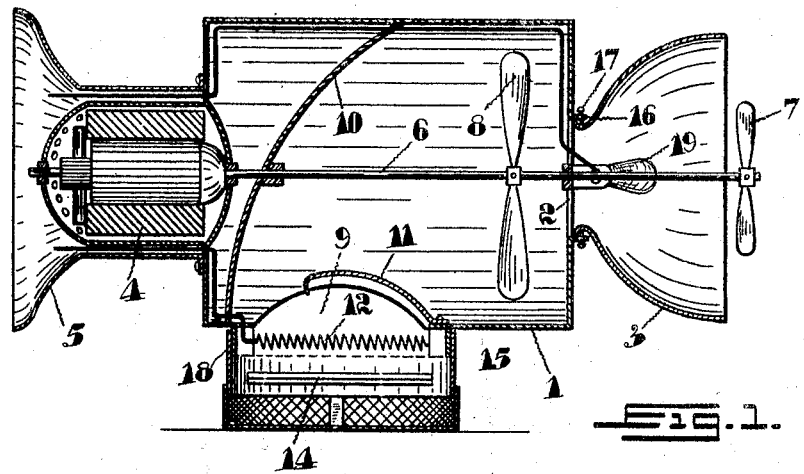
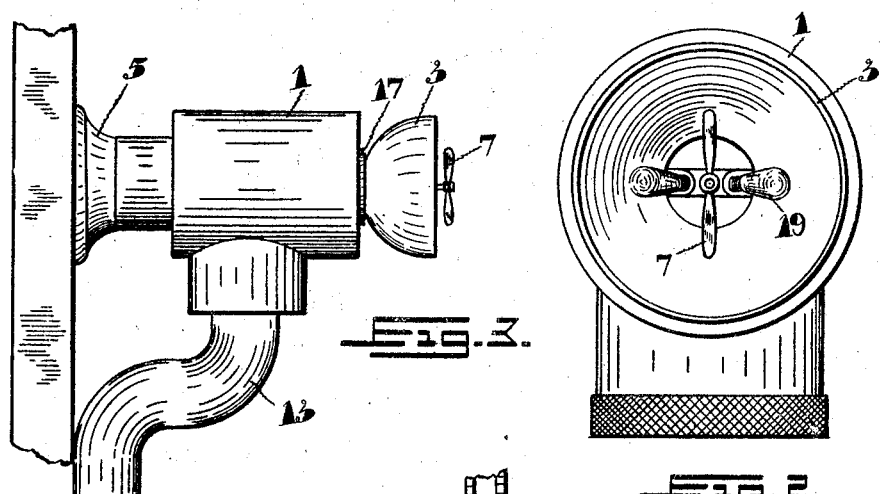
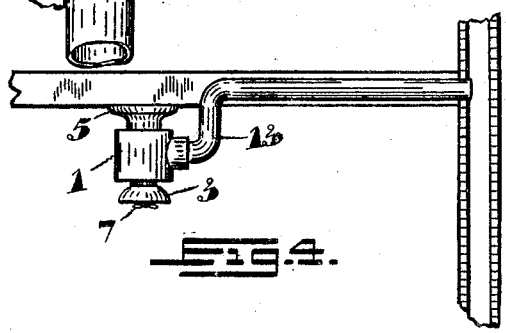
INVENTOR.
R. E. Hunt.
BY J. Edward Maybee
ATTY Patented May 11, 1926.

1,583,975

UNITED STATES PATENT OFFICE.

RICHARD ERNEST HUNT, OF TORONTO, ONTARIO, CANADA.

INSECT AND GERM TRAP AND DESTROYER.

Application filed April 21, 1924. Serial No. 707,982.

This invention relates to devices used for catching flies, mosquitoes and other insects, and the object of my invention is to devise means which will be more effective in catching insects than the apparatus previously known; which will attract the insects to a position where they will be caught; which will contain means for destroying the insects; which may be used as the lighting fixture of a room and which will therefore have a pleasing appearance; and which may be used for carrying off foul air from a room.

I attain my object by means of the constructions hereinafter described and illustrated in the accompanying drawings in which—

Fig. 1 is a longitudinal section of my improved apparatus;

Fig. 2 a front view of the same;

Fig. 3 a view showing my apparatus secured to a wall or post; and

Fig. 4 a view showing the apparatus secured to a ceiling.

1 is a cylindrical casing, having an opening 2 at one end thereof with which opening communicates the small end of a funnel-shaped nozzle 3. This nozzle 3 may be permanently secured to the casing 1, although I preferably form an annular flange 16 about the opening 2, so that the nozzle 3 may be detachably secured thereto by means of screws 17 passing through the flange. It will thus be seen that when my device is used in conjunction with the lighting of a room that an attractive glass shade, for example, may be used as the nozzle. At the other end of the casing 1 is supported a motor 4, preferably encased in a suitable canopy 5 by means of which my apparatus may be secured to a wall as shown in Fig. 3, or to a ceiling as shown in Fig. 4. Suitably journalled in the casing is the motor shaft 6, which shaft extends slightly beyond the large end of the casing 3. On the outer end of this shaft is mounted a suction fan 7, by means of which any insects coming within range of the fan, are drawn into the nozzle 3. Also mounted on the shaft is the fan 8.

In the bottom of the casing 1 is formed a discharge opening 9, and guides 10 and 11 are provided within the casing for directing the insects to the side of the opening 9 remote from the fan 8. The fan 8 while it assists in drawing insects from the nozzle into the casing 1 also serves the purpose of directing the insects through this discharge opening 9.

Located immediately below this opening is the electric heating element 12. This element forms a fine screen on which the insects forced through the opening 9 lodge and on which they remain until they are burnt by the heat of the element, the ashes passing between the parts of the element and falling down to an asbestos slab 14, the upper surface of which slab is coated with adhesive material. This slab is removably supported in an extension 15 supported about the opening 9, which extension is closed at its lower end. The wall of the extension 15 between the slab 14 and the bottom is formed of perforated material for the escape of air drawn into the casing by the fans. The extension 15 is preferably made removable, the casing being provided with a flange 18 on which the extension is sleeved.

In order to attract insects to a position where they will come under the influence of the fan 7, I provide in the nozzle 3 one or more lamps 19, to which power will be supplied from the same source as for the motor.

The device shown in Fig. 1 is particularly adapted for standing on a table or other support. The device may, however, as shown in Figs. 3 and 4, be supported from a wall or ceiling by means of the canopy 5.

As above suggested, the extension 15 with the slab 14 may, if desired, be omitted, and the end of a suitable conduit 13 may be fitted on the flange 18 to carry off the ashes, which conduit might lead to any convenient flue, such as a chimney. When this conduit is used the device may be used for ventilating purposes.

The electrical connections for the motor, the heating element 12, and the lamp 16, will preferably be arranged so that they may be operated simultaneously or independently, and that the motor may be controlled so that it will operate at different speeds.

It will be understood, of course, that the apparatus described may be considerably altered without departing from the spirit of my invention, which briefly comprises the provision of means for trapping the insects; means for attracting the insects to a position where they will come under the influence of the trapping means; and means for destroying the insects.

What I claim is:—

1. In a device of the character described, the combination of a casing constructed of an imperforate material having an inlet opening and a discharge opening formed therein; incinerating means located adjacent the discharge opening, said incinerating means being adapted to allow the ashes to pass therethrough; and means for receiving ashes after they pass through said incinerating means.

2. In a device of the character described, the combination of a casing constructed of an imperforate material having an inlet opening and a discharge opening formed therein; incinerating means located adjacent the discharge opening, said incinerating means being adapted to allow the ashes to pass therethrough; and means for receiving ashes after they pass through said incinerating means comprising a plate, having an adhesive surface, located below said incinerating means.

3. In a device of the character described, the combination of a casing formed of an imperforate material and having an inlet opening and a discharge opening formed therein; incinerating means located adjacent the discharge opening, said incinerating means being adapted to allow the ashes to pass therethrough; means for forcing air into the interior of the casing; and means for causing a current of air in said casing adapted to force insects carried into the interior of said casing with said air on to the incinerating means and their ashes through said incinerating means.

4. In a device of the character described, the combination of a casing constructed of an imperforate material and having an inlet opening and a discharge opening formed therein; incinerating means located adjacent the discharge opening, said incinerating means being adapted to allow the ashes to pass therethrough; means for forcing air into the interior of the casing; means for causing a current of air in said casing adapted to force insects carried into the interior of said casing with said air onto the incinerating means and their ashes through said incinerating means; and means for receiving the ashes after they pass through the incinerating means.

5. In a device of the character described, the combination of a casing having an inlet opening and a discharge opening formed therein; a nozzle adapted to direct air through the inlet opening; a motor; a shaft journalled in the casing and driven by the motor, said shaft extending to a point adjacent the outer end of the nozzle; a fan on the outer end of said shaft adapted to direct air through the nozzle into the casing; and a second fan adapted to direct insects entering the container with said air through the discharge opening.

6. In a device of the character described, the combination of a casing having an inlet opening and a discharge opening formed therein; a nozzle adapted to direct air through the inlet opening; incinerating means located adjacent the discharge opening; a motor; a shaft journalled in the casing and driven by the motor, said shaft extending to a point adjacent the outer end of the nozzle; a fan on the outer end of said shaft adapted to direct air through the nozzle into the casing; and a second fan adapted to direct insects entering the container with said air on to the incinerating means.

7. In a device of the character described, the combination of a casing having an inlet opening and a discharge opening formed therein; a nozzle adapted to direct air through the inlet opening; incinerating means located adjacent the discharge opening, said incinerating means being adapted to allow the ashes to pass therethrough; a motor; a shaft journalled in the casing and driven by the motor, said shaft extending to a point adjacent the outer end of the nozzle; a fan on the outer end of said shaft adapted to direct air through the nozzle into the casing; a second fan adapted to direct insects entering the container with said air on to the incinerating means blow their ashes through said incinerating means; and means for receiving ashes after they pass through said incinerating means.

Signed at Toronto, Canada, this 11th day of April, 1924.

RICHARD ERNEST HUNT.